(12) United States Patent
Crane et al.

(10) Patent No.: US 6,530,236 B2
(45) Date of Patent: Mar. 11, 2003

(54) METHOD AND APPARATUS FOR CONTROLLING THE REMOVAL OF HEAT FROM THE CONDENSER IN A REFRIGERATION SYSTEM

(75) Inventors: Curtis C. Crane, York, PA (US); John F. Judge, Stewartstown, PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 09/838,196

(22) Filed: Apr. 20, 2001

(65) Prior Publication Data

US 2003/0014986 A1 Jan. 23, 2003

(51) Int. Cl.⁷ .............. F25B 39/04; F25B 31/00
(52) U.S. Cl. .............. 62/89; 62/192; 62/228.3
(58) Field of Search ............... 62/181, 184, 192, 62/225, DIG. 17, 228.3

(56) References Cited

U.S. PATENT DOCUMENTS

| | | | |
|---|---|---|---|
| 3,390,539 A | 7/1968 | Miner | 62/184 |
| 3,811,292 A | 5/1974 | Hoenisch | 62/183 |
| 4,085,594 A | 4/1978 | Mayer | 62/171 |
| 4,193,781 A * | 3/1980 | Vogel et al. | 62/181 X |
| 4,555,910 A | 12/1985 | Sturges | 62/184 |
| 4,930,320 A | 6/1990 | Ide et al. | 62/184 |
| 4,936,107 A | 6/1990 | Kitagaki et al. | 62/184 |
| 4,941,325 A | 7/1990 | Nuding | 62/158 |
| 4,974,420 A * | 12/1990 | Kramer | 62/118 X |
| 5,040,377 A | 8/1991 | Braun et al. | 62/183 |
| 5,058,390 A | 10/1991 | Sindermann et al. | 62/181 |
| 5,067,326 A | 11/1991 | Alsenz | 62/193 |
| 5,138,844 A | 8/1992 | Clanin et al. | 62/89 |
| 5,255,529 A | 10/1993 | Powell et al. | 62/180 |
| 5,255,530 A | 10/1993 | Janke | 62/180 |
| 5,289,692 A | 3/1994 | Campbell et al. | 62/181 |
| 5,400,611 A | 3/1995 | Takeda et al. | 62/158 |
| 5,522,231 A | 6/1996 | Kenyon et al. | 62/129 |
| 6,041,605 A | 3/2000 | Heinrichs | 62/84 |
| 6,161,394 A | 12/2000 | Alsenz | 62/184 |
| 6,170,277 B1 * | 1/2001 | Porter et al. | 62/DIG. 17 |

FOREIGN PATENT DOCUMENTS

| | | | |
|---|---|---|---|
| EP | 0 152 608 A2 | 8/1985 | F25B/49/00 |
| EP | 0 355 180 A2 | 2/1990 | F25B/49/00 |
| EP | 1 072 847 A2 | 1/2001 | F24F/11/00 |
| WO | WO-98/06987 A2 | 2/1998 | F25B/49/02 |

* cited by examiner

Primary Examiner—William Wayner
(74) Attorney, Agent, or Firm—Brian T. Sattizahn; Carmen Santa Maria; McNees Wallace & Nurick LLC

(57) ABSTRACT

This invention increases efficiency of a refrigeration system by maximizing the cooling of the condenser and reducing unnecessary work done by the compressor. In air cooled systems it will also increase the stability of the fans by reducing fan cycling. The fan controller will utilize an algorithm that will consider the following inputs: oil pressure, compressor suction pressure, expansion valve position, compressor loading, last compressor loading change, and current fan stage. The algorithm uses fuzzy logic to characterize the inputs and generates an output that controls the system cooling fans.

37 Claims, 9 Drawing Sheets

OIL-SUCTION DIFF. TERMS:

| PSID | SMALL | MEDIUM | LARGE |
|------|-------|--------|-------|
| 50   | 1     | 0      | 0     |
| 65   | 1     | 0      | 0     |
| 95   | 0     | 1      | 0     |
| 125  | 0     | 0      | 1     |
| 150  | 0     | 0      | 1     |

PLOT OF OIL-SUCTION DIFF. TERMS:

THIS PLOT IS BASED ON A NON-PROGRAMMABLE SUCTION-OIL DIFFERENTIAL PRESSURE SHUTDOWN OF 50 PSID.

METHOD AND APPARATUS FOR CONTROLLING THE REMOVAL OF HEAT FROM THE CONDENSER IN A REFRIGERATION SYSTEM

BACKGROUND OF THE INVENTION

The present invention relates to refrigeration systems, and, more particularly, it relates to a method and apparatus for controlling removal of heat from the condenser of a mechanical refrigeration system, particularly but not exclusively a liquid chiller refrigeration system.

Large capacity, liquid chiller, refrigeration systems typically employ multiple fans for removal of heat from the high temperature side of an operating system or from the condenser or cooling tower of such a system. The amount of heat removal is usually determined by the number of the multiple fans that are operated at one time, but may be varied by speed control of one or more of the fans, or in other ways that provide for variable circulation of a cooling medium past the relatively hot refrigerant in the condenser or water in the cooling tower. Moreover, the amount of heat removed from the high temperature side of a refrigeration system has an effect on the operating efficiency of the overall system under differing operating conditions.

Conventional fan controllers control the fans based on the discharge pressure and temperature of the system compressor and/or ambient air temperature. Conventional controllers also shut down the entire refrigeration systems, when certain safety conditions are sensed. Use of such limited operating parameters and controls, however, frequently leads to inefficient and unsteady operation of the condenser or cooling tower fans.

SUMMARY OF THE INVENTION

To achieve the advantages and in accordance with the purpose of the invention, as embodied and broadly described herein, the invention is directed to a method and system for controlling the cooling of refrigerant in the condenser, to maximize efficiency and safety. In a preferred embodiment, the method and system controls the cooling of refrigerant in the condenser and/or the expansion valve position.

The invention includes a refrigeration system that circulates a refrigerant through a closed loop having a high pressure side extending from a compressor, though a condenser, to a flow-restricting expansion device, and a low pressure side extending between the expansion device, through an evaporator, to the compressor. The invention further includes a variable capacity cooling system to cool refrigerant in the condenser and a controller to monitor pressures associated with the high and low sides of the system, wherein the controller adjusts the variable capacity cooling system to lower the pressure associated with the high side of the system by increasing cooling of refrigerant in the condenser toward or at the maximum level, while maintaining an acceptable pressure differential between the high pressure side of the system and the low pressure side of the system. Under the invention, the controller also can monitor other conditions, such as superheat or liquid content of the refrigerant proximate the inlet of the compressor, to maintain an acceptable amount of superheat in the refrigerant applied to the compressor, and/or ensure that liquid refrigerant is not applied to the compressor.

In another aspect, the advantages of the invention are achieved and the purpose thereof is served by a method for controlling a refrigeration system that circulates a refrigerant through a closed loop having a high pressure side extending from a compressor, through a condenser, to a flow-restricting expansion device, and a low pressure side extending between the expansion device, through an evaporator, to the compressor, the method including monitoring system pressure on the high side and low side of the system, monitoring superheat of the refrigerant in the low pressure side of the system, and periodically increasing cooling of the refrigerant in the condenser toward the maximum possible level as long as the superheat of the refrigerant in the low pressure side of the system exceeds a minimum threshold value and a refrigerant pressure differential between the high and low pressure sides of the system exceeds a minimum threshold value. In a similar fashion, the method can include monitoring the pressure of oil applied to a compressor, the superheat, or liquid content of refrigerant, and periodically increasing the cooling of the refrigerant, as long as one or both of these monitored conditions does not exceed an acceptable level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DESCRIPTION OF THE PREFERRED EMBODIMENTS

Reference will now be made in detail to exemplary embodiments of the invention, examples of which are illustrated in the accompanying drawings. Wherever possible, the same reference numbers will be used throughout the drawings to refer the same parts.

Figure 1:
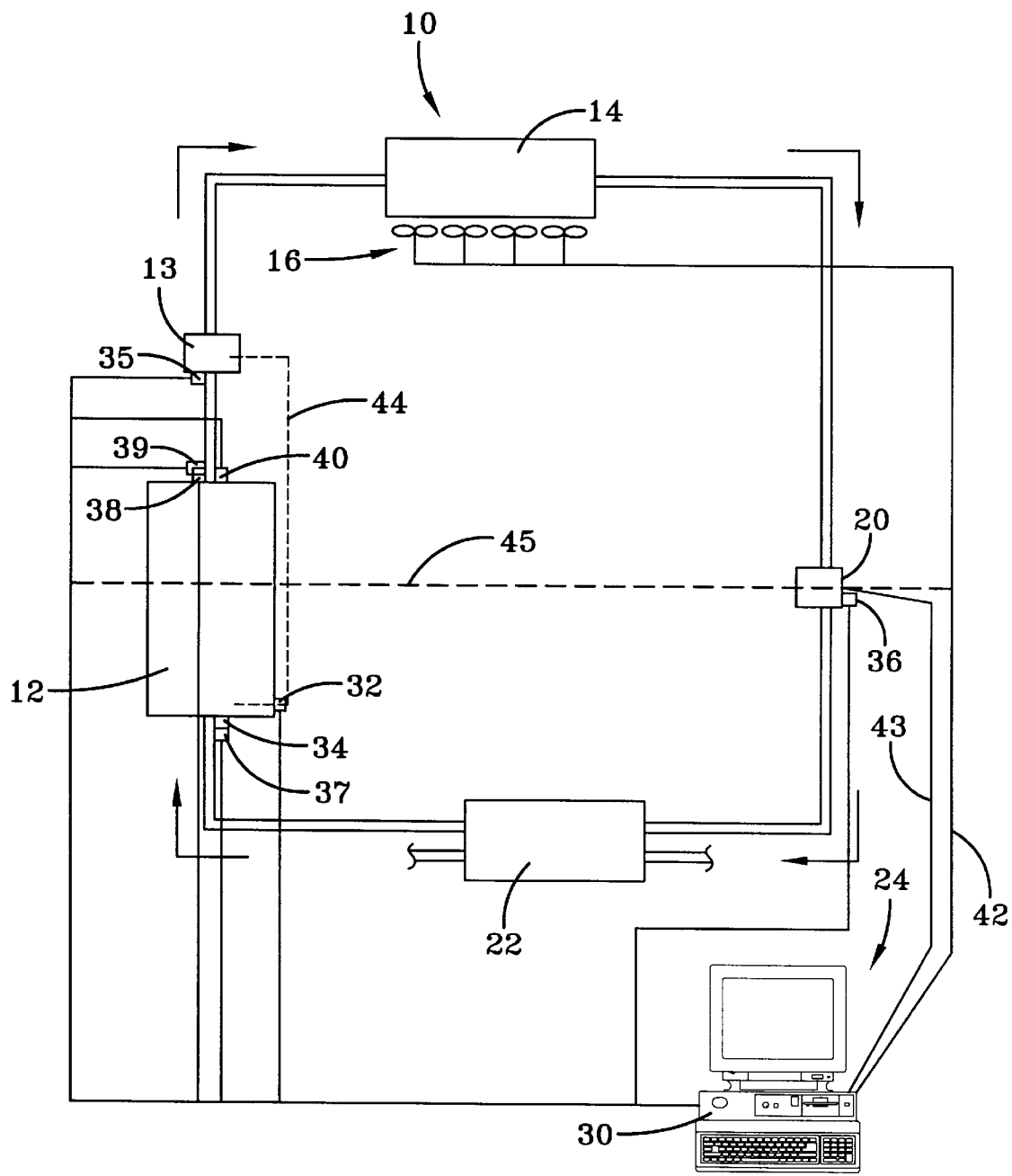
FIG. 1 is a is a schematic diagram of the refrigeration system and the controller with its inputs and output.

The refrigeration system is generally designated by reference number 10 and shown in a schematic diagram in FIG. 1. The refrigeration system 10 processes a refrigerant through a refrigeration cycle in the direction indicated by the arrows. The system 10 includes, connected via a refrigerant circuit, a compressor 12, which is a variable capacity compressor or compressor system, an oil separator 13, a condenser 14, a variable capacity cooling apparatus 14 and 16 for cooling the refrigerant in the condenser, an expansion valve 20, and an evaporator 22 to bring in heat into the system. The variable capacity compressor system may consist of one variable capacity it compressor, a staged capacity compressor, or a number of compressors that can be staged.

The variable capacity cooling apparatus for cooling the condenser includes an air cooled condenser 14 and at least one variable capacity cooling system, preferably a variable capacity fan 16 to blow air across the condenser 14. In the embodiments illustrated, a plurality of fans 16 are staged to provide variable cooling capacities. In other embodiments, the variable capacity cooling apparatus may include a liquid cooled condenser 14a and a cooling liquid that exchange heat through a heat exchanger as shown generally in FIG. 2. The invention can be applied to a variety of systems that include a variable capacity cooling system to cool the refrigerant at the condenser.

In one embodiment, the system 10 is used for cooling air directly or indirectly. For example, the system may be used to chill water for use in a building air conditioning system. The system 10 processes a refrigerant, to create the cooling. The refrigerant can then chill water or cool air directly. The invention can also be applied to a heat pump.

Figure 2:
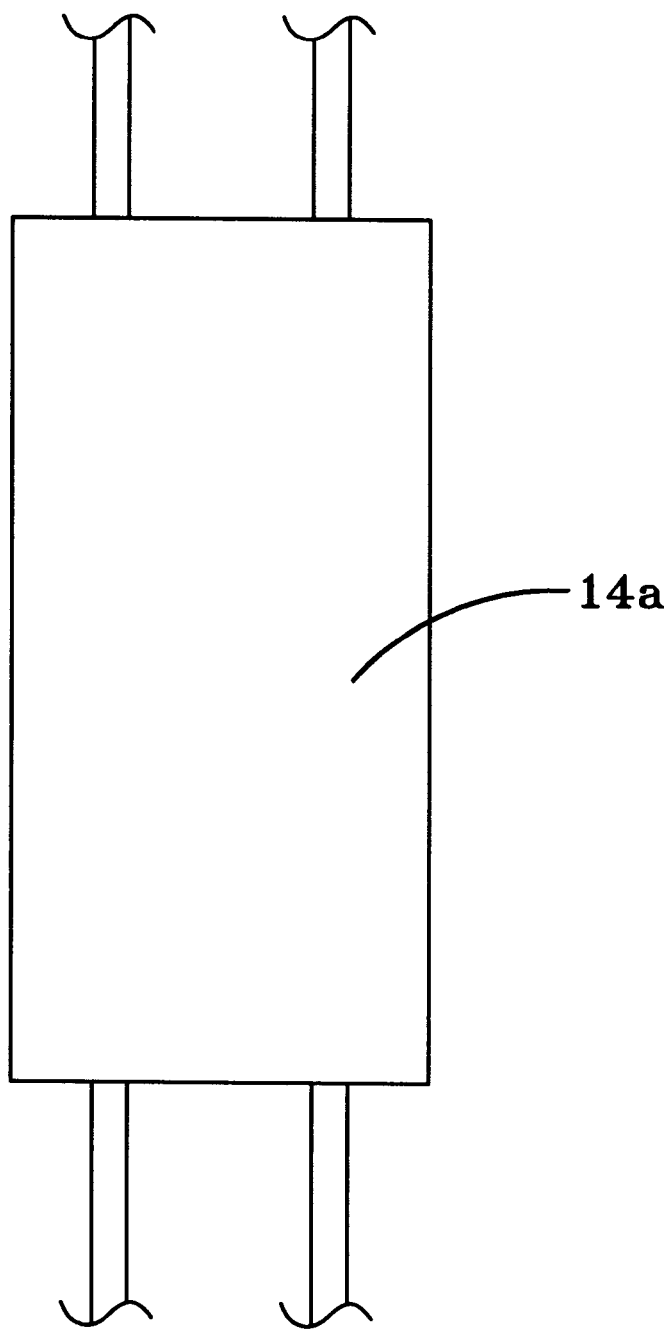
FIG. 2 is a partial schematic diagram of a liquid cooled heat exchanger which expels heat from the refrigeration system.
Figure 3:
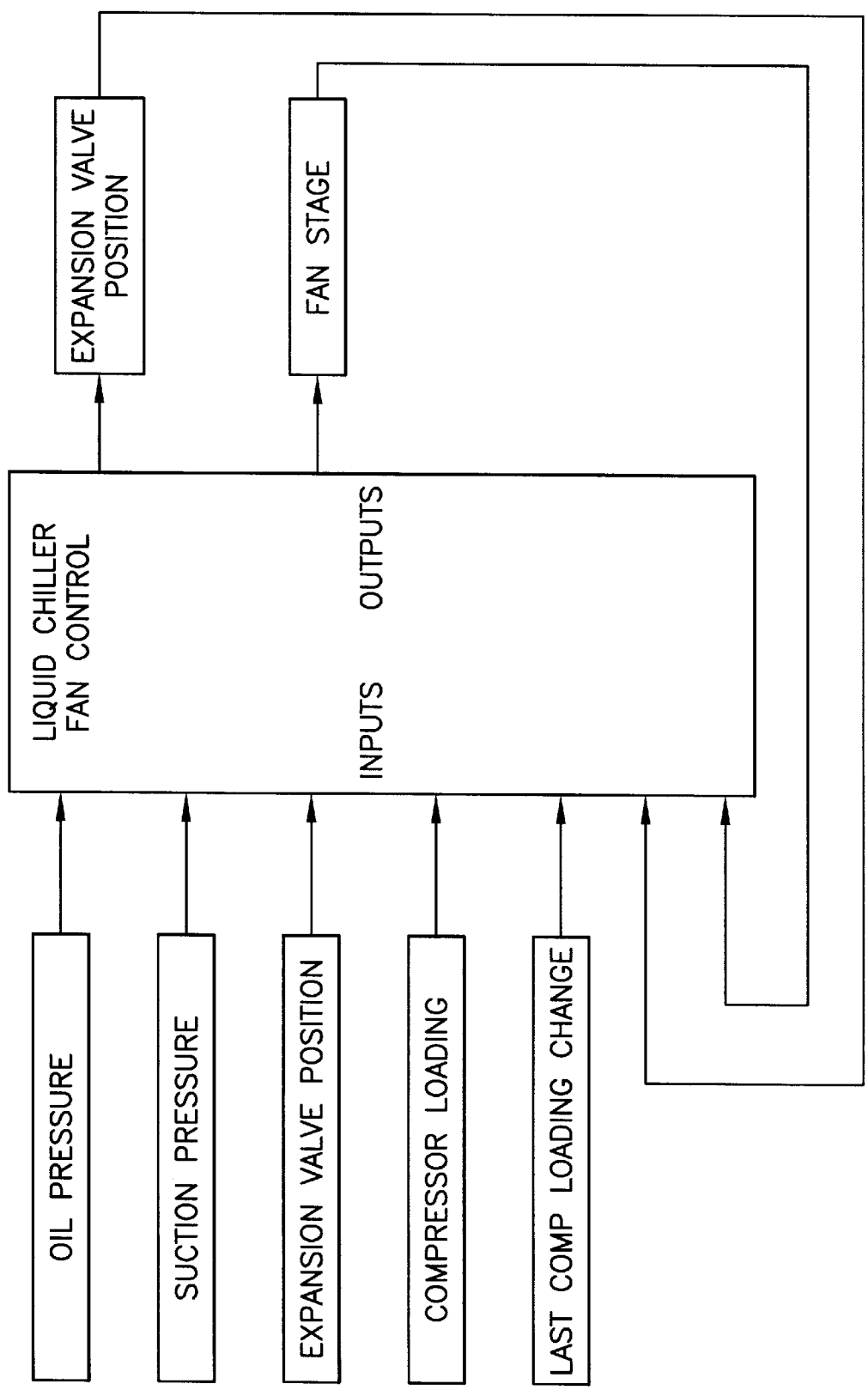
FIG. 3 is a schematic diagram of the input and output of the controller.

In the refrigeration cycle, starting at the compressor 12, the refrigerant is compressed to form a high temperature, high pressure superheated gas. Some lubricant from the compressor flows out the outlet of the compressor, along with the refrigerant. The compressed refrigerant flows to the oil separator where lubricating oil is separated out from the refrigerant and returned to the compressor. Next, the refrigerant travels to a condenser 14 which may be air cooled by staged fans 16 blowing across it as shown in FIG. 1 or liquid cooled as shown in FIG. 2. In theory, both air and liquid cooling systems could be combined to provide variable capacity cooling system. The condenser 14 removes heat from the refrigerant causing the refrigerant to change to a warm temperature liquid.

The refrigerant then travels to the expansion valve 20 where the refrigerant is throttled and expands and changes to a low pressure, cold, saturated gas. Next, the refrigerant travels to the evaporator 22. In the evaporator 22, the refrigerant provides cooling to whatever the system is applied to cool, typically air or water. For example, the water to be chilled is chilled by the transfer of heat from the water to the cold refrigerant in the evaporator 22. This transfer of heat into the refrigerant vapor raises the temperature of the refrigerant to above the saturation point of the refrigerant ensuring the refrigerant is a "dry" gas, meaning there is no liquid present. The refrigerant then travels to the compressor 12 where the system cycle is repeated.

In the system shown in FIG. 1, the compressor is lubricated by lubricating oil. Oil in the refrigerant leaving the compressor is separated out of the compressor by an oil separator 13. The separated oil is then driven from the sump of the oil separator back into the compressor 12 by the difference in pressure between the oil separator 13, which is approximately equal to the outlet pressure of the compressor 12, and the low pressure side or suction pressure of the compressor 12. The oil travels to the compressor 12 through an oil line shown as dashed line 44 on FIG. 1. In other adaptations of the refrigeration system (not shown), the amount of oil in the compressor can be kept at a safe level by pumping oil with an oil pump or some other method.

Dashed line 45 illustrates the division between the high and low pressure portions of the system 10. The high pressure portion includes the compressor outlet, the oil separator 13, the condenser 14, and the inlet side of the expansion valve. The low pressure portion includes the outlet side of the expansion valve, the evaporator 22, and the suction inlet of the compressor 12.

In the system illustrated in FIG. 1, the differential pressure between the pressure in the oil separator and the inlet or sump of the compressor must be sufficiently large to drive oil back from the separator to the compressor. If the pressure differential becomes too low, the compressor will not be lubricated properly and may seize, or become damaged. As explained below, this differential pressure can be affected by the manner in which other aspects of the system of the present invention are controlled. One objective of the invention is to periodically determine this pressure differential, optimizing the differential, and shut down the operation of the refrigerant system if the differential pressure becomes too low.

As also explained in more detail below, another objective of the present invention is to operate the system as efficiently and inexpensively as possible, while ensuring the safety of the system from damage or danger. Cooling the refrigerant at the condenser will tend to decrease the pressure differential across the compressor. In that regard, the energy costs to run the compressor at a high pressure differential is normally higher than the energy costs to run the cooling fans at the condenser at maximum capacity, and lessen the differential. On the other hand, if the pressure of the refrigerant at the expansion valve becomes too low, the expansion valve will not provide the necessary flow to the evaporator and the compressor. A principle of the invention therefore is to cool the refrigerant at the condenser to the optimum degree permitted, without lowering the pressure to a degree that does not provide needed flow of oil back into the compressor and/or the needed flow of refrigerant through the expansion valve.

A compressor designed to compress a gas may be damaged when liquid refrigerant enters the compressor. Ideally, the refrigerant exiting the evaporator would be a uniformly saturated vapor. However, in practice this is almost never the case. In order to preserve compressors from damage caused by liquid refrigerant entering the compressor, refrigeration system operators often ensure the refrigerant vapor is 5° to 15° F. above the saturation temperature. This overheating of vapor above the saturation temperature is called superheat. Superheat provides a factor of safety against liquid entering the compressor.

An effect of superheat is that it lowers the pressure of the low side of the refrigeration system. The lower the low side pressure the more the compressor must work to pump the refrigerant to the high side of the system. While superheat is necessary to provide a factor of safety for the compressor, higher superheat lessens the efficiency of the system and makes it more costly to operate.

One way of controlling superheat is to control the expansion of the refrigerant in the expansion valve. The expansion valve works best when there is a large pressure difference between the high and low pressure side of the valve. To ensure an acceptable pressure difference on each side of the expansion valve is maintained, controllers of refrigeration systems often maintain high compressor exit pressures. However, maintaining a high discharge pressure is expensive due to the large amount of energy required to operate a compressor at a high pressure differential.

The amount of cooling of refrigerant provided at the condenser 14 affects the thermodynamic properties of the refrigerant and the system 10. For example, cooling of refrigerant in the condenser 14 tends to decrease the pressure of the refrigerant at the condenser and thus the pressure at the outlet of the compressor. In one adaptation of the refrigeration system, the cooling of the refrigerant in the condenser 14 is accomplished with a plurality of fans 16 blowing air across the condenser 14. The rate of cooling of the refrigerant in the condenser 14 is controlled by the number and/or capacity of fans 16 blowing air across the condenser 14. Other embodiments of the system may control the cooling of the refrigerant by varying the speed of one or more variable capacity fans or by varying the number and speed of the fans 16 operating at any given time. In systems where the fan speed is variable, a single cooling fan 16 can be used, at least for lower capacity systems. The fan or fans 16 are controlled by a system controller 24. As explained in more detail below, the controller 24 receives input data from a number of sensors and controls the cooling system for the condenser.

In a system with a liquid cooled condenser as shown in FIG. 2, the condenser 14a is cooled by a liquid flowing through a heat exchanger. The controller 24 controls the heat transfer from the system by regulating the flow or rate of flow of the cooling liquid relative to the refrigerant.

System controllers may take a variety of forms known in the art. By means of example only, a controller can be a microprocessor or integrated chip programmed to apply the rules described below. As shown in FIG. 1, a controller 24 can also be a computer 30 loaded with a software program. Preferably, the controller 24 receives data as inputs from several sources in the refrigeration system, including direct input from the system operator, or predetermined set points, or both. The system controller 24 preferably is a non-linear MIMO (Multiple Input Multiple Output) type controller. Depending on the predetermined set points and the sensed parameters, the controller manipulates the variable capacity cooling apparatus 14 and 16 to engage in more cooling, less cooling, or maintained cooling of the refrigerant in the condenser 14. The degree of control depends on the data the controller receives and the algorithm it applies to the data and the preselected set points or similar parameters.

Refrigeration systems may be controlled in a variety of ways. One type of refrigeration system can include three different controllers. One controller controls the output of the compressor, another controller controls the cooling of refrigerant in the condenser. In systems with an electronic expansion valve, a third controller can control the expansion valve position. The controllers that accomplish these functions may be separate controllers or several functions of the individual controllers may be combined into a controller which controls a variety of tasks. The present invention may be applied to a system regardless of whether the system uses one or several controllers.

In one application of the invention, the cooling of the refrigerant in the condenser is controlled by a controller which only controls the cooling of refrigerant in the condenser. In this type of system, the expansion valve may be an nonadjustable orifice, and electronic expansion valve with a separate controller, or a self-adjusting thermal expansion valve that self-adjusts based on the temperature and/or pressure of the refrigerant. This type of controller does not control an expansion valve position, but it may monitor it.

The controller 24 monitors pressures of the refrigerant, to ensure there is a sufficient pressure differential to return oil from the oil separator to the compressor. The controller also knows the status of the elements it is controlling, e.g. the fans and the expansion valve.

In the preferred embodiment of the system shown in FIG. 1, sensors 32 and 34–40 sense parameters and transmit data to the controller 24 concerning the physical conditions of various components of the refrigeration system 10. In some systems, some of the parameters may be input by the operator of the refrigeration system rather then input to the controller by sensors 32 and 34–40 as in the system shown in FIG. 1. The controller 24 shown in FIG. 1 receives signals representative of: the oil pressure at the compressor 12 inlet sensed by sensor 32, the pressure of refrigerant at the low pressure end or suction inlet of the compressor 12 sensed by sensor 34, the pressure of the oil at the oil separator 13 sensed by sensor 35, and the compressor loading sensed by sensor 38. Additionally, the expansion valve position is sensed by sensor 36. The pressure detecting sensors may be pressure transducers and the temperature sensing sensors may be thermistors, as well as other pressure or temperature sensors well known and used in the art.

Oil separator 13 is connected to the low pressure side of the compressor 12 with an oil line 44. The difference in pressure between the pressure in the oil separator 13 and the pressure of the oil sump in the compressor 12 (essentially the inlet pressure of the compressor) drives lubricating oil (not shown) into the compressor 12. The pressure sensed by sensor 35 and sensor 32 are input to the controller and the controller calculates the pressure differential. If the pressure differential becomes so low for a particular system that oil is not returned to the compressor to the degree required, the controller will shut the system down. The lowest acceptable pressure differential for a given system can be determined through testing and then input into the control. As explained below, the pressure differential can be affected by the operation of other elements in the system, including the degree of cooling at the condenser and the opening of the expansion valve.

The sensing of the above pressure differential in a preferred embodiment of the invention and the use of that value as a control parameter ensures that sufficient oil is provided to the working parts of the compressor. In other embodiments a compressor can be lubricated by a pressurized lubrication system. In such a system, the oil pressure can be sensed and used as a control parameter.

The expansion valve position may be either sensed with a sensor 36 as in FIG. 1 or the valve position can be input to the controller by a system operator, or otherwise known by the controller. For a given compressor setting, manipulating the expansion valve position adjusts the flow and pressure of the refrigerant through the system 10. If the valve 20 is open wide, more refrigerant will flow through the valve causing the pressure on the low side of the system to increase and the pressure on the high side of the system to decrease. Closing the valve has an opposite effect on the system 10. When the valve opening is reduced, the high side of the system increases in pressure while the low side decreases.

As the high side pressure increases relative to the inlet pressure, the compressor 12 must use more energy to pump a given amount of refrigerant through the system. Cooling of the refrigerant in the condenser reduces this pressure. However, too much cooling can reduce the high side pressure at the expansion valve to too low a value, resulting in a lower refrigerant flow at the expansion valve, for a given opening. In certain circumstances, the position of a variable expansion valve can be changed, in response to such a condition. If the refrigerant flow becomes too high, then the level of superheat in the refrigerant about to enter the compressor may become too low and liquid refrigerant may enter the compressor. One way to increase flow is to open the valve further, if it is not at the maximum open position. If the expansion valve is in the maximum open position, less cooling, i.e., shutting down fans should occur in the condenser to raise the high side pressure and thus cause more refrigerant to flow through the expansion valve. Thus, manipulating the expansion valve is a way to control the pressure differential and superheat at the compressor inlet.

In a preferred embodiment of the system of the present invention, the loading of the compressor is varied in response to the refrigeration needs of the space being conditioned by the system. This is typically achieved through a thermostat. The compressor loading is the percentage of available compressor capacity being used at a given time. In a system where screw compressors are used, the compressor loading may be referred to as slide valve position. In a system where a reciprocating compressor is used, one way to vary the compressor load is to adjust the number of cylinders operating. Thus, in these types of systems; the compressor loading may be expressed as the number of cylinders or the number of compressors operating. The compressor loading may be input directly into the controller 24 by the operator of the system, or it may be sensed by a sensor as in FIG. 1 and this sensed data can be applied by the controller.

By knowing the compressor loading change, the controller can anticipate what components it will manipulate next. If the compressor's loading is increasing, the controller will anticipate when it will increase the cooling in the condenser to balance the increase in compressor work. The opposite is also true. If the compressor's loading is decreasing, the controller will, based on its algorithm, reduce condenser cooling. By sensing the compressor loading change the controller will be able to anticipate how to and then manipulate the condenser cooling before the sensors report to the controller a change in refrigerant conditions.

In the application of the present invention, the characteristics of a given refrigeration system is determined by analytical or empirical analysis, or a combination of both. The control of the system is then adapted to apply the resultant characteristics (such as a predetermined lowest safe pressure differential or the acceptable compressor inlet pressure) and the sensed parameters of the working system, to control the system and maximize its efficiency, while operating in safe ranges. Thus, once a given system, such as a particular capacity commercial system, is designed and made, the system is then tested to determine the minimum pressure differential needed across the compressor to keep sufficient oil returning to the compressor from the oil separator. If necessary, the difference can be determined for different loads of the compressor. The relation of sensed values at various points in the system are determined. The relationship of the expansion valve versus sensed parameters and safety conditions can also be determined for a given system.

After a given system is calibrated, the control is designed to control the system according to its characteristics, which are inputted into the program, and the sensed parameters. For example, when a system according to the present invention is turned on, the variable capacity cooling apparatus 14 and 16 are initially set to a minimum amount of refrigerant cooling in the condenser 14. For systems with multiple fans such as a system as shown in FIG. 1, the fans are all turned off. For variable capacity fan, it is initially set at its lowest position. Once the controller senses a need for more heat removal, the controller increases the cooling provided by the variable capacity cooling apparatus 14 and 16 or 14*a*, as determined by predetermined rules programmed into the controller 24. This will cause the high pressure side of the system to decrease in pressure, for given load positions of the compressor and the expansion valve. The control then operates the cooling system at the maximum cooling capacity, as long as the pressure differential at the compressor and separator stays within a safe range, and the compressor inlet stays within a safe range. If the pressure differential decreases to a predetermined safe minimum for the system or if the compressor inlet pressure reaches a predetermined minimum level, the control will then maintain or reduce the degree of cooling in the condensor. The control periodically reviews the sensed values and controls the cooling to provide maximum efficiency. If the pressure differential or compressor inlet pressure becomes too low for a predetermined period of time the control will shut the system down.

As the system operates, it periodically processes the data input and determines whether the system needs to increase, decrease, or maintain the present rate of heat loss from the refrigerant in the condenser 14 to stabilize the refrigeration system 10 and operate it efficiently then adjusts the variable capacity cooling apparatus 14 and 16 accordingly.

The controller is electrically connected to the variable capacity cooling apparatus as shown in FIG. 1 with reference number 42, and thus it is able to transmit the controller output to the variable capacity cooling apparatus 14 and 16 and control the amount of cooling provided by the variable capacity cooling apparatus 14 and 16. The controller manipulates variable cooling apparatus 14 and 16 according to an algorithm that uses the data input mentioned above and compares it according to a predetermined set of rules. The predetermined rules are intended to maintain the system parameters at acceptable levels while at the same time reduce the amount of work the compressor 12 does.

The controller uses an algorithm to process the input data and determine output. The controller is a Multiple Input Multiple Output type (MIMO) which can process multiple inputs and multiple outputs. The inputs and the parameters are those mentioned above and the output controls the variable system used to provide refrigerant cooling in the condenser.

Each refrigeration system, depending on its components, will have a particular set of parameters which will yield acceptable and efficient results. Since each system with a given set of components will have unique operating parameters, the predetermined rules incorporated into the control algorithm will vary according to the characteristics of the system. To determine the target operating conditions, a given system is tested to determine safe operating conditions for that system.

In another application of the invention, the controller can control the position of the expansion valve as well as the adjustable cooling apparatus. By controlling the expansion valve position, the controller is able to control the amount of refrigerant that flows through the system. Controlling the position of the expansion valve will, among other things, affect the flow of refrigerant through the refrigeration system and the pressure and temperature (i.e. the superheat) of the refrigerant at various stages in the system. Thus an additional principle of the invention when applied to a controller of the expansion valve and variable cooling apparatus is to provide a controller that balances the proper amount of superheat.

In a system were the controller controls both the variable cooling apparatus for the condenser and the expansion valve, additional sensors and outputs of the controller are used. FIG. 1 shows the additional inputs and outputs of an expansion valve and cooling apparatus controller. In FIG. 1, sensors 32 and 34–40 sense parameters and transmit data to the controller 24 concerning the physical conditions of various components of the refrigeration system 10. In some systems, some of the parameters may be input by the operator of the refrigeration system rather then input to the controller by sensors 32 and 34–40 as in the system shown in FIG. 1. The controller 24 shown in FIG. 1 receives signals representative of: the oil pressure at the compressor 12 inlet sensed by sensor 32, the pressure of refrigerant at the low pressure end or suction inlet of the compressor 12 sensed by sensor 34, the pressure of the oil at the oil separator 13 sensed by sensor 35, the temperature of the refrigerant at the compressor inlet sensed by sensor 37, the compressor loading sensed by sensor 38, the temperature of the refrigerant at the compressor outlet is sensed by sensor 39 and the pressure of the refrigerant at the compressor 12 outlet sensed by sensor 40. Additionally, the expansion valve position is sensed by sensor 36. The pressure detecting sensors may be pressure transducers and the temperature sensing sensors may be thermistors, as well as other pressure or temperature sensors well known and used in the art.

In a preferred system where the controller controls the expansion valve position, the controller is electrically connected, as shown in FIG. 1 with reference number 43, to the expansion valve in order to control it.

Where the controller adjusts the expansion valve, the controller will also monitor and control the valve so that the refrigerant is permitted to expand enough to avoid the problem of too much or not enough superheat while also allowing enough refrigerant to flow through the system to allow the system to operate effectively and avoiding an excessive compressor outlet pressure In a system with an adjustable expansion valve, the initial conditions of the system includes those previously described as well as the following valve conditions. The expansion valve is initially placed in the most closed position. As the system runs, the controller opens the valve as determined by the determined rules programmed into the controller. The setting of the expansion valve preferably is set at an orifice size that provides at least the minimum flow of refrigerant needed to provide the desired cooling at the evaporator and to match the output the compressor. Restricting the orifice tends to lessen flow and increase the pressure differential across the compressor, for a given cooling of a given flow of the refrigerant at the condenser. As mentioned above, opening the expansion valve raises the low side pressure and lowers the high side pressure. This allows the compressor to not work as much because the pressure difference between the two sides of the system is diminished. Raising the pressure level of the low side of the system, decreases the amount of superheat in the refrigerant about to enter the compressor. If the superheat level drops too low, the system is in danger of sending liquid refrigerant into the compressor.

The reverse is also true. Closing the valve causes the pressure of the a high side of the system to increase and the pressure of the low side to decrease. The increase in the pressure differential causes the compressor to work harder to pump refrigerant to the high side of the system. Closing the valve also increases the amount of superheat in the refrigerant about to enter the compressor due to the fact that the low side of the system loses pressure. Thus, if a system has too much superheat, the controller should open the valve. If it does not have enough superheat, the controller should close the valve.

Once the system is operating, the controller periodically processes data and opens, maintains, and closes the variable expansion valve, as well as operates the variable cooling apparatus for the condenser. The controller compares the monitored conditions to an algorithm to determine what components to manipulate.

A number of different MIMO controls can be used to apply the principles of the invention. In one preferred embodiment, a controller's algorithm includes using fuzzy logic rules to analyze input and generate output. The data input from each component in the system is characterized by the controller using fuzzy logic control rules. As the data input for each value enters the controller, the controller characterizes that value into categories. The controller uses fuzzy logic principles to place the input into percentages of categories. For example, if the controller was programmed to consider the input for a certain parameter with a nominal value of 0 to be small, 0.5 to be medium, and 1 to be large, and the value transmitted to the controller were 0.3, the controller could not consider the value to be either small or medium because 0.3 falls between 0 and 0.5. Instead of characterizing that value to be in one or the other category, the controller would characterize that value to be 40% small and 60% medium (because 0.3 is 60% of 0.5, the medium value) for a linear fuzzy input set. Likewise a value of 0.75 would be characterized as 50% medium and 50% large and a value of 0.5 would be characterized as 0% small 100% medium and 0% large.

The following is an example of a system using a given screw compressor with a slide valve with target operating parameters already determined. Certain states of the cycle are input and characterized as follows. The oil suction differential value, the suction pressure, and the compressor load are characterized by the controller to one of three categories: small, medium, or large. The last change in compressor load is characterized by the controller into one of three categories; unload, hold, and load. The expansion valve (EV) position is characterized by the controller to one of two categories, small or large. Once the input is characterized into categories or percentages of categories, the controller compares the characterized data based on rules similar to the ones shown in the following tables. Of course, the rules shown in this example are for illustrative purposes because each individual system will require rules adapted to the operating parameters of each system, and the desired outputs.

Note: Shaded items are only used if available. Dashed lines indicate that value is not considered in that case because other conditions are of overriding importance.

TABLE 10

Conditions which result in less cooling of refrigerant.
Fuzzy Control Rules

| | L1 | L2 | L3 | L4 | L5 | L6 | L7 |
|---|---|---|---|---|---|---|---|
| Inputs | | | | | | | |
| Oil-Suction Diff | Small | Medium | — | Medium | Medium | Large | Medium |
| Suction Pressure | — | — | Small | Medium | Medium | Medium | Large |
| EEV Position | — | Small | Large | Large | Large | Large | Large |
| Last Compressor Load Change | — | Unload | — | Unload | Load | Load | Unload |
| Compressor Load Outputs | | | | | | | |
| Fan Change | Less | Less | Less | Less | Less | Less | Less |

TABLE 11

Conditions which result in result in more cooling of refrigerant.

| Fuzzy Control Rules | M1 | M2 | M3 |
|---|---|---|---|
| Inputs | | | |
| Oil-Suction Diff | Medium | Large | Large |
| Suction Pressure | — | — | Large |
| EV Position | Small | Small | Large |
| Last Compressor Load Change | Load | — | Unload |
| Compressor Load Outputs | | | |
| Cooling Change | More | More | More |

TABLE 12

Conditions which result in no change in cooling of refrigerant.
Fuzzy Control Rules

| | H1 | H2 | H3 | H4 | H5 | H6 | H7 | H8 |
|---|---|---|---|---|---|---|---|---|
| Inputs | | | | | | | | |
| Oil-Suction Diff | Medium | Medium | Large | Large | Medium | Medium | Large | Large |
| Suction Pressure | — | Medium | Medium | Medium | Large | Large | Large | Large |
| EV Position | Small | Large | Large | Large | Large | Large | Large | Large |
| Last Compressor Load Change | Hold | Hold | Unload | Hold | Hold | Load | Hold | Load |
| Compressor Load Outputs | | | | | | | | |
| Cooling Change | Hold | Hold | Hold | Hold | Hold | Hold | Hold | Hold |

For each rule, the value of the parameter with the smallest characterized value is used as the value of the output. The reason that the smallest characterized value is used when calculating each rule is that all terms in a rule are ANDed together. The AND function is the same as the minimum function in this case. When calculating the output sets, the maximum value is used because all rules yielding the same output are ORed together. The OR function is also the maximum function in this case. For example, consider rule L3 on table 10. If Suction Pressure had a characterized value of 0.4 and EV Position had a characterized value of 0.5, then 0.4 would be the characterized value of rule L3's output of less cooling because 0.4 is the value of the smallest characterized value considered in L3. The outputs from each rule are compared only against the outputs of the other rules of the same set of less, more, or hold cooling. The highest characterized value of the outputs for each of the three sets rules, namely the rules resulting in more, less, or hold cooling, are used to form a weighted average. This weighted average is the output of the controller and controls change (if any) in the removal of heat from the system.

Figure 9:
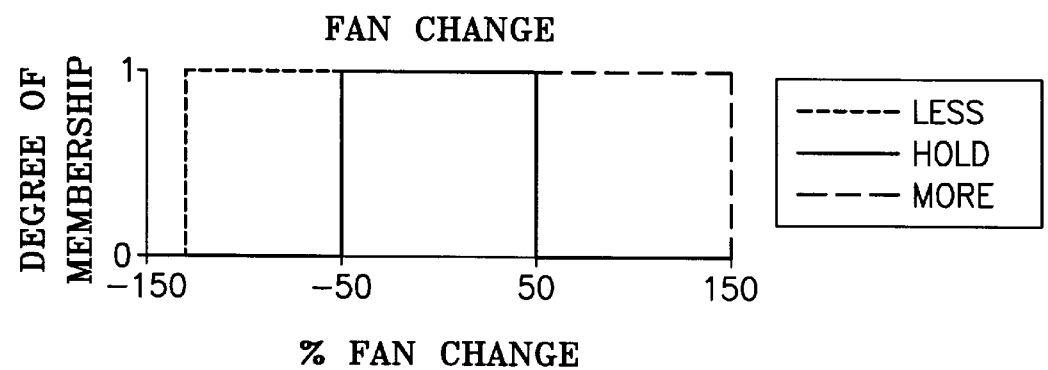
FIG. 9 is a chart and graph showing how an exemplary controller will it characterize fan change terms.

To defuzzify the data or, in other words, to use the weighted average to determine the change in fan stage, a simple centroid method on rectangular regions, as shown in the plot in FIG. 9, is used. In a system where a plurality of fans with the same capacity are used, the percent Fan Change will be multiplied by the number of fans running. A result of 100% or greater will turn on one fan and a result of 100% or less will turn off one fan. Values between −100% and 100% result in no fan change. In systems with variable fan speeds, fan change values will be use to adjust fan speed and numbers.

Figure 4:
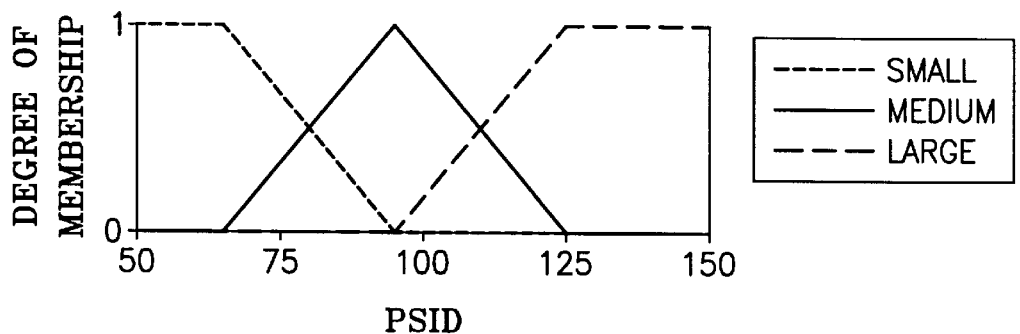
FIG. 4 is a chart and graph showing how an exemplary controller will characterize oil-suction differential terms based on a suction-oil differential shutdown of 50 PSID.
Figure 5:
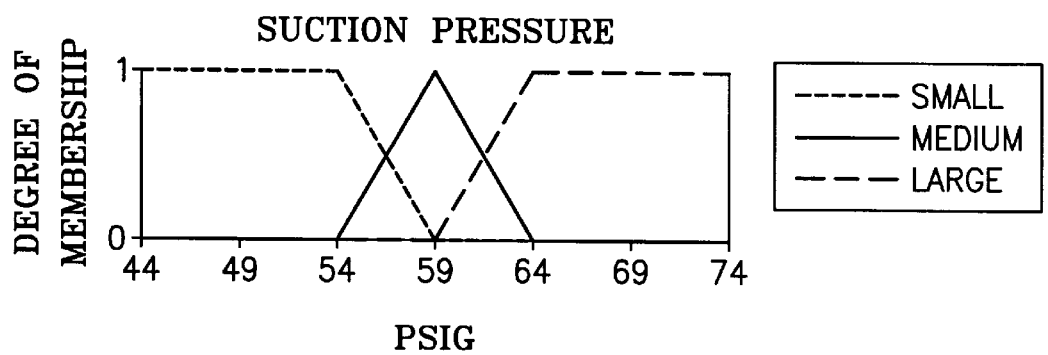
FIG. 5 is a chart and graph showing how an exemplary controller will characterize suction pressure terms based on a suction pressure shutdown of 44 PSIG.
Figure 6:
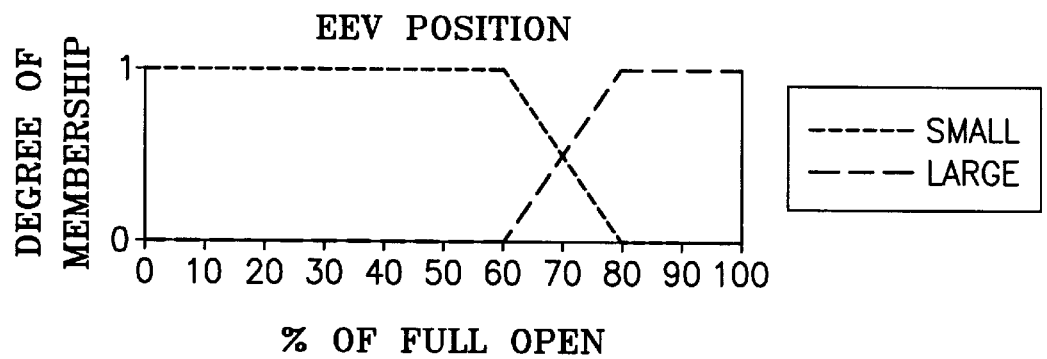
FIG. 6 is a chart and graph showing how an exemplary controller will characterize electronic expansion valve position terms.
Figure 7:
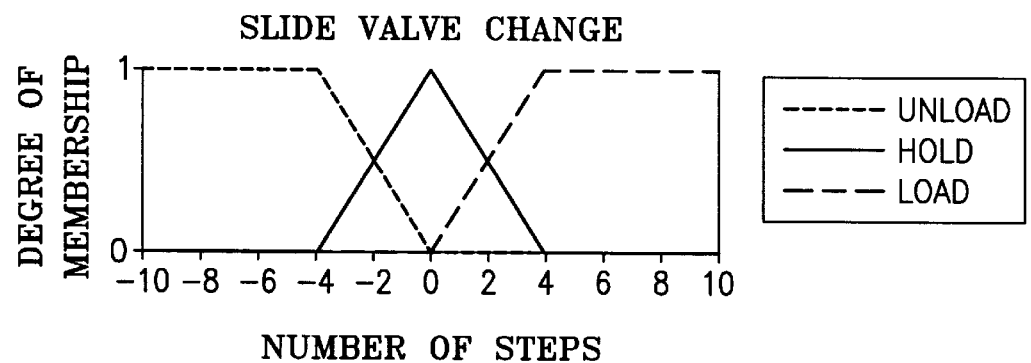
FIG. 7 is a chart and graph showing how an exemplary controller will characterize slide valve change terms.
Figure 8:
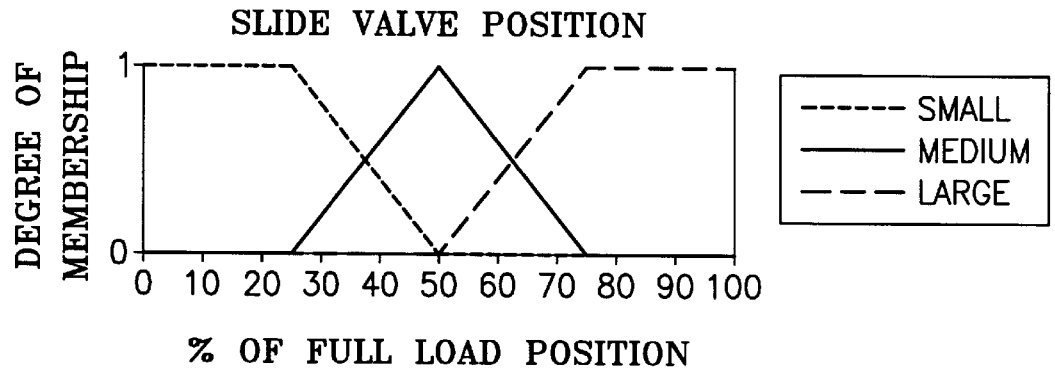
FIG. 8 is a chart and graph showing how an exemplary controller will characterize slide valve position terms.

The invention will be further clarified by the following example, which is intended to be purely exemplary of the invention. If the oil-suction differential pressure shut down pressure was 50 PSID (D for the difference in pressure between the oil pressure and low pressure end of the compressor), the fuzzy logic characteristics could be determined in the ways illustrated on FIGS. 4–8. The controller could characterize an oil-suction differential pressure of 65 PSID or less to be 100% small and 0% medium as shown on FIG. 4 where 1 represents 100%. Again, referring to FIG. 4, when the oil-suction differential pressure is at 95 PSID the controller could characterize the oil-suction differential pressure to be 0% small, 100% medium, and 0% large. Other values between the 0% and 100% values are characterized as shown on the graph in FIG. 4.

Similar fuzzy logic rules may be assigned for the other parameters as well. FIGS. 5–8 show how other values may be characterized for different parameters of a refrigeration system.

FIG. 9 shows how to defuzzify or use the weighted average to determine the change in fan stage. To do so, a simple centroid method on rectangular regions, as shown in the plot in FIG. 9 is used. The percent Fan Change will be multiplied by the number of fans running. A result of 100% or greater will turn on one fan and a result of 100% or less will turn off one fan. Values between –100% and 100% result in no fan change.

It is apparent to those skilled in the art that some of the advantages of the invention include making a refrigeration system more reliable and less expensive to operate by increasing the efficiently of the system. By reducing the need for the system to maintain a high compressor exit pressure, the compressor will not unnecessarily consume energy by maintaining an unnecessarily high compressor exit pressure. Additionally, the controller efficiently controls heat expulsion from the refrigeration system. For example, in a system that gets rid of waste heat by air cooling, the invention maximizes the number of fans cycling. By maximizing the number of fans cycling, the refrigeration system will expel heat quickly thus allowing the system to more speedily reach a steady state. Additionally, maximizing the number of fans reduces the amount of fan cycling of any one fan thus increasing the life of the fan motors and electrical components. The increased life of the fan motors and electrical components will make the entire system more reliable and stable in its operation.

It will be apparent to those skilled in the art that various modifications and variations can be made in the selection of parameters to use as input to the controller and the values selected to characterize them in the present invention and in construction of this refrigeration system controller without departing from the scope or spirit of the invention. As an example, the shut down parameters will vary from system to system. Also, the system could expel heat in a variety of ways such as through a condenser, a cooling tower, or other air or liquid cooled heat transfer device of which there are many known in the art. The controller itself could be in the form of software or hardware. The refrigeration system may not have an adjustable expansion valve, but rather us one that is fixed.

Additionally it can be appreciated that some refrigeration systems are reversible and are referred to in the art as heat pumps. In reversible systems the condenser can act as an evaporator and the evaporator can act as a condenser depending on which way the system is operating. Thus, the invention may be applied to heat transfer components in such systems where the heat transfer components are to acting as a condenser.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A refrigeration system that circulates a refrigerant through a closed loop having a high pressure side extending from a compressor, through a condenser, to a flow-restricting expansion device, and a low pressure side extending between the expansion device, through an evaporator, to the compressor, further comprising:

a variable capacity cooling system to cool refrigerant in the condenser;

a controller that monitors the pressure associated with the low side of the system; and wherein the controller adjusts the variable capacity cooling based on that pressure, while maintaining an acceptable pressure in the low pressure side of the system using fuzzy logic principles.

2. The refrigeration system of claim 1, wherein the controller further monitors at least one of a lubrication oil pressure for the compressor and a difference in pressure associated with a return oil line and the compressor and the controller and reduces or maintains the capacity of the variable capacity cooling system if the monitored lubrication oil pressure or the difference in pressure reaches or falls below a predetermined minimum level.

3. The refrigeration system of claim 1, wherein the controller reduces an amount of cooling provided by the variable capacity cooling system or shuts down the refrigeration system when the pressure associated with the low side of the system approaches or falls below a predetermined minimum level.

4. The refrigeration system of claim 1, further comprising sensors for detecting a representative pressure of refrigerant being applied to the compressor.

5. The refrigeration system of claim 1, wherein the controller also monitors whether the compressor is increasing, decreasing or maintaining a loading status and uses that monitored information when controlling the variable capacity cooling system.

6. The refrigeration system of claim 1, wherein the variable capacity cooling system comprises at least one fan blowing air across the condenser and the variable capacity cooling system varies capacity by at least one of: turning on an additional fan, turning off a fan, or changing a fan speed.

7. The refrigeration system of claim 1, wherein the variable capacity cooling system includes a liquid cooled heat exchanger.

8. The refrigeration system of claim 1, wherein the controller monitors an expansion valve position, anticipates an acceptable maximum amount of cooling based on the expansion valve position, and adjusts the variable cooling system accordingly.

9. The refrigeration system of claim 1, wherein the controller monitors a current level of cooling of refrigerant in the condenser and anticipates an acceptable maximum amount of cooling the system will permit base on the current level of cooling of refrigerant in the condenser and adjusts the variable cooling system accordingly.

10. A refrigeration system that circulates a refrigerant through a closed loop having a high pressure side extending from a compressor, through a condenser, to a flow-restricting expansion device, and a low pressure side extending between the expansion device, through an evaporator, to the compressor, the system comprising:

a variable capacity cooling system to cool refrigerant in the condenser; and a controller that monitors the pressure associated with the low side of the system and at least one of a lubrication oil pressure for the compressor and a difference in pressure associated with a return oil line and the compressor and adjusts the variable capacity cooling based on the monitored pressures while maintaining an acceptable pressure in the low pressure side of the system and an acceptable pressure associated with the lubrication oil for the compressor.

11. The refrigeration system of claim 10, wherein the controller also monitors whether the compressor is increasing, decreasing or maintaining a loading status and uses that monitored information when controlling the variable capacity cooling system.

12. The refrigeration system of claim 10, wherein the controller monitors an expansion valve position, anticipates an acceptable maximum amount of cooling based on the expansion valve position and the other monitored conditions information, and adjusts the variable cooling system accordingly.

13. The refrigeration system of claim 10, wherein the controller monitors a current level of cooling of refrigerant in the condenser and anticipates an acceptable maximum amount of cooling based on the current level of cooling of refrigerant in the condenser and the other monitored conditions and adjusts the variable cooling system accordingly.

14. A method for controlling a refrigeration system that circulates a refrigerant through a closed loop having a high pressure side extending from a compressor, through a condenser, to a flow-restricting expansion device, and a low pressure side extending between the expansion device, through an evaporator, to the compressor, the method comprising:
monitoring system pressure on the and low side of the system; and
periodically increasing cooling of the refrigerant in the condenser toward the maximum possible level as long as the low pressure side of the system exceeds a minimum threshold value.

15. The method of claim 14, further comprising:
monitoring a pressure or a pressure differential associated with the lubrication oil for the compressor; and
periodically adjusting the cooling of the refrigerant based on the monitored conditions parameters.

16. The method of claim 14, wherein the compressor is a variable capacity compressor with variable output, and wherein the method further comprises the steps of:
monitoring whether the compressor is increasing, decreasing, or maintaining its output; and
adjusting the amount of cooling of refrigerant in the condenser based on the monitored conditions.

17. The method of claim 14, wherein the cooling of refrigerant in the condenser is increased to or maintained at the maximum possible level when the monitored conditions are within acceptable threshold values.

18. A refrigeration system that circulates a refrigerant through a closed loop having a high pressure side extending from a compressor, through a condenser, to a flow-restricting expansion device, and a low pressure side extending between the expansion device, through an evaporator, to the compressor, further comprising:
a variable capacity cooling system to cool refrigerant in the condenser; and
a controller to monitor pressures associated with the high and low sides of the system and the amount of superheat in the refrigerant applied to the compressor;
wherein the controller adjusts the variable capacity cooling system to lower the pressure associated with the high side of the system by increasing cooling of refrigerant in the condensor toward or at the maximum level, while maintaining an acceptable pressure differential between the high pressure side of the system and the low pressure side of the system and an acceptable amount of superheat in the refrigerant applied to the compressor.

19. The refrigeration system of claim 18, further comprising: an adjustable flow restricting expansion device,
wherein the controller also monitors the setting of the adjustable flow restricting expansion device and adjusts the adjustable flow-restricting expansion device to decrease the pressure associated with the high side of the system while maintaining an acceptable pressure differential between the high pressure side of the system and the low pressure side of the system and an acceptable amount of superheat in the refrigerant exiting the evaporator.

20. The refrigeration system of claim 18, wherein the controller monitors a lubrication oil pressure for a compressor or a difference in pressure associated with an oil separator and a pressure in the compressor and the controller is configured to perform at least one of the following: adjust the variable capacity cooling apparatus, further restrict an adjustable flow-restricting device, or shut down the compressor depending on monitored parameters.

21. The refrigeration system of claim 18, wherein the variable capacity cooling apparatus comprises a variable capacity fan.

22. The refrigeration system of claim 18, further comprising sensors for detecting a representative pressure and temperature of refrigerant being applied to the compressor.

23. The refrigeration system of claim 18, wherein the flow-restriction expansion device is adjustable.

24. The refrigeration system of claim 18, wherein the controller monitors whether the compressor is increasing, decreasing or maintaining a loading status and anticipates an effect the compressor loading status will have on the pressure associated with the high side of the system and analyzes the anticipated effect when controlling the variable capacity cooling apparatus.

25. A refrigeration system that circulates a refrigerant through a closed loop having a high pressure side extending from a compressor, through a condenser, to an adjustable flow-restricting expansion device, and a low pressure side extending between the expansion device, through an evaporator, to the compressor, further comprising:
a variable capacity cooling system to cool refrigerant in the condenser; and
a controller to monitor pressures associated with the high and low side of the system and an amount of superheat in the refrigerant applied to the compressor;
wherein the controller adjusts at least one of the variable capacity cooling system and the adjustable flow-restricting expansion device to lower the pressure associated with the high side of the system, while maintaining an acceptable pressure differential between the high pressure side of the system and the low pressure side of the system and an acceptable amount of superheat in the refrigerant applied to the compressor.

26. The refrigeration system of claim 25, wherein the variable capacity cooling system comprises at least one fan blowing air across the condenser and the variable capacity cooling system varies capacity by at least one of: turning on an additional fan, turning off a fan, or changing a fan speed.

27. The refrigeration system of claim 25, further comprising sensors for detecting a representative pressure and temperature of the refrigerant being applied to the compressor.

28. The refrigeration system of claim 25, wherein the controller monitors whether the compressor is increasing, decreasing or maintaining a loading status and anticipates an effect the compressor loading status will have on the pressure associated with the high side of the system and analyzes the anticipated effect when controlling at least one of the variable capacity cooling apparatus and the flow-restriction of the expansion device.

29. A method for controlling a refrigeration system that circulates a refrigerant through a closed loop having a high pressure side extending from a compressor, through a condenser, to a flow-restricting expansion device, and a low pressure side extending between the expansion device, through an evaporator, to the compressor, the method comprising:

monitoring system pressure on the high side and low side of the system;

monitoring superheat of the refrigerant in the low pressure side of the system; and periodically increasing cooling of the refrigerant in the condenser toward the maximum possible level as long as the superheat of the refrigerant in the low pressure side of the system exceeds a minimum threshold value and a refrigerant pressure differential between the high and low pressure sides of the system exceeds a minimum threshold value.

30. The method of claim 29, further comprising the step of maintaining the cooling of the refrigerant in the condenser to at the maximum possible level as long as the superheat of the refrigerant applied to the compressor and the pressure differential between the high and low side of the system are within acceptable threshold values.

31. The method of claim 29, further comprising the step of decreasing cooling of refrigerant in the condenser when the superheat of the refrigerant in the low pressure side of the system is less than a minimum threshold value.

32. The method of claim 29, further comprising the step of decreasing the cooling of refrigerant in the condenser when the refrigerant pressure differential between the high and low pressure sides of the system is less than a minimum threshold value.

33. The method of claim 29, further comprising:

monitoring a lubrication oil pressure for a compressor or monitoring a difference in pressure between pressure at an oil separator and pressure in the compressor;

performing at least one of decreasing: cooling of refrigerant in the condenser and shutting down the compressor, if the lubrication oil pressure or pressure difference is less than a minimum threshold value.

34. The method of claim 29, wherein monitoring the superheat includes monitoring the pressure and temperature of the refrigerant between the evaporator and the compressor.

35. The method of claim 29, wherein the superheat is monitored between the evaporator and the compressor inlet.

36. The method of claim 29, wherein the compressor is a variable capacity compressor with variable output, and wherein the method further comprises the steps of:

monitoring whether the compressor is increasing, decreasing, or maintaining its output; and adjusting the refrigeration system to counter-balance the compressor's change in output by adjusting the amount of cooling of refrigerant in the condenser.

37. The method of claim 29, wherein the cooling of refrigerant in the condenser is increased to and maintained at the maximum possible level when the monitored conditions are within acceptable threshold values.

* * * * *

UNITED STATES PATENT AND TRADEMARK OFFICE
CERTIFICATE OF CORRECTION

PATENT NO. : 6,530,236 B2  
DATED : March 11, 2003  
INVENTOR(S) : Curtis C. Crane and John F. Judge It is certified that error appears in the above-identified patent and that said Letters Patent is hereby corrected as shown below:

Column 2,
Line 53, "it" should be deleted.

Column 3,
Line 7, "it" should be deleted.

Signed and Sealed this

Thirtieth Day of September, 2003

JAMES E. ROGAN  
*Director of the United States Patent and Trademark Office*